(12) United States Patent
Joo et al.

(10) Patent No.: US 11,049,440 B2
(45) Date of Patent: Jun. 29, 2021

(54) DISPLAY APPARATUS AND CONTROLLING METHOD THEREOF

(71) Applicant: SAMSUNG ELECTRONICS CO., LTD., Suwon-si (KR)

(72) Inventors: Sungyong Joo, Suwon-si (KR); Taehyuck Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/601,942

(22) Filed: Oct. 15, 2019

(65) Prior Publication Data

US 2020/0126476 A1    Apr. 23, 2020

(30) Foreign Application Priority Data

Oct. 22, 2018    (KR) ........................ 10-2018-0125808

(51) Int. Cl.
*G09G 3/32* (2016.01)
*G09G 3/20* (2006.01)

(52) U.S. Cl.
CPC ................. *G09G 3/32* (2013.01); *G09G 3/20* (2013.01); *G09G 2330/023* (2013.01); *G09G 2340/14* (2013.01)

(58) Field of Classification Search
CPC .......... G06F 3/1446; G09G 3/20; G09G 3/32; G09G 2300/026; G09G 2330/08; G09G 2330/02; G09G 2330/023; G09G 2340/14
See application file for complete search history.

(56) References Cited

U.S. PATENT DOCUMENTS 8,902,127 B2 * 12/2014 Li ............................ G09F 9/33
                                                            345/1.3
9,286,020 B2 *  3/2016 Dunn ........................ G06F 3/14
(Continued)

FOREIGN PATENT DOCUMENTS

EP    3 324 284    5/2018
EP    3 474 263    4/2019
(Continued)

OTHER PUBLICATIONS

International Search Report and Written Opinion dated Jan. 30, 2020 in counterpart International Patent Application No. PCT/KR2019/013470.
(Continued)

*Primary Examiner* — Vijay Shankar
(74) *Attorney, Agent, or Firm* — Nixon & Vanderhye P.C.

(57) ABSTRACT

Disclosed is a display apparatus. The display apparatus includes a display including a first display module and a second display module, a first driving module comprising driving circuitry connected to the first display module, a second driving module comprising driving circuitry connected to the second display module, a processor configured to: obtain total power consumption of the first display module and second display module based on brightness of an input image, obtain supply power of each of the first driving module and second driving module based on the obtained total power consumption, and control the first driving module and the second driving module based on the obtained supply power, and the processor may control the display apparatus so that a part of supply power of the first driving module is provided to the second display module based on power consumption of the first display module.

18 Claims, 13 Drawing Sheets

(56) References Cited

U.S. PATENT DOCUMENTS

| | | | |
|---|---|---|---|
| 10,324,299 B2 | 6/2019 | Lee | |
| 10,431,138 B2 | 10/2019 | Cho et al. | |
| 10,540,134 B2 * | 1/2020 | Lee | G09G 5/003 |
| 10,650,732 B2 * | 5/2020 | Lee | G06F 3/1446 |
| 2009/0312884 A1 | 12/2009 | Li et al. | |
| 2018/0008947 A1 | 1/2018 | Choi et al. | |
| 2018/0061298 A1 | 3/2018 | Cho et al. | |
| 2018/0062528 A1 | 3/2018 | Liu et al. | |
| 2018/0067869 A1 | 3/2018 | Yang et al. | |
| 2018/0076708 A1 | 3/2018 | Bulzacchelli et al. | |
| 2018/0077229 A1 | 3/2018 | Bharrat et al. | |
| 2018/0089881 A1 | 3/2018 | Johnson | |
| 2018/0293935 A1 | 10/2018 | Lee et al. | |
| 2019/0392750 A1 | 12/2019 | Cho et al. | |

FOREIGN PATENT DOCUMENTS

| | | |
|---|---|---|
| JP | 2007-298778 | 11/2007 |
| JP | 2016-206542 | 12/2016 |
| KR | 10-0698154 | 3/2007 |
| KR | 10-2017-0103271 | 9/2017 |
| KR | 10-1777295 | 9/2017 |
| KR | 10-2018-0023704 | 3/2018 |
| KR | 10-2018-0023705 | 3/2018 |
| KR | 10-2018-0045527 | 5/2018 |
| WO | 2018/038338 | 3/2018 |

OTHER PUBLICATIONS

Partial Search Report dated Mar. 5, 2020 in counterpart European Patent Application No. 19204375.0.
Extended Search Report and Written Opinion dated May 29, 2020 in counterpart European Patent Application No. 19204375.0.

* cited by examiner

DISPLAY APPARATUS AND CONTROLLING METHOD THEREOF

CROSS-REFERENCE TO RELATED APPLICATION

This application is based on and claims priority under 35 U.S.C. § 119 to Korean Patent Application No. 10-2018-0125808, filed on Oct. 22, 2018, in the Korean Intellectual Property Office, the disclosure of which is incorporated by reference herein in its entirety.

BACKGROUND

Field

The disclosure relates to a display apparatus and a controlling method thereof and, for example, to a display apparatus implemented as a plurality of modules and a controlling method thereof.

Description of Related Art

Development in electronic technology has led to development and distribution of various types of display apparatuses, and a demand for a large-scaled display apparatus has been increasing.

Specifically, there has been a continued demand for a light-weight large display composed of a plurality of display modules (for example, a light emitting diode (LED) cabinet).

The peak brightness of each of the plurality of display modules is determined according to the power capacity supplied to each of the plurality of display modules and thus, for high dynamic range (HDR) or peak brightness output, the power capacity of a power supply needs to be relatively large.

There is a problem in that the larger the power capacity of the power supply, the more difficult it becomes to make a display apparatus that is light-weight, and a manufacturing cost rises.

SUMMARY

Embodiments of the disclosure provide a display apparatus capable of efficiently implementing peak brightness through power sharing among a plurality of display modules and a controlling method thereof.

According to an example embodiment, a display apparatus includes a display including a first display module and a second display module, a first driving module comprising driving circuitry connected to the first display module, a second driving module comprising driving circuitry connected to the second display module, a processor configured to obtain total power consumption of the first display module and second display module based on a brightness of an input image, to obtain supply power of each of the first driving module and second driving module based on the obtained total power consumption, and to control the first driving module and the second driving module based on the obtained supply power, and the processor may be configured to control the display apparatus to provide a part of supply power of the first driving module to the second display module based on power consumption of the first display module.

The processor may obtain the total power consumption based on individual power consumption of the first display module and the second display module, and obtain the supply power for each of the first driving module and second driving module by bisecting (e.g., averaging) the total power consumption.

The processor may be configured to control the display apparatus so that a remainder of the supply power of the first driving module is provided to the first display module, and so that a part of the supply power of the second driving module is provided to the first display module and a remainder is provided to the second display module based on power consumption of the second display module.

The display apparatus may include a switch connected to each of the first driving module and the second driving module, and the processor may, based on an error being identified in the first driving module, be configured to block supply power of the first driving module to be supplied to the first display module and the second display module by controlling a first switch connected to the first driving module, wherein the first display module is configured to be driven based on the supply power supplied from the second driving module.

The processor may control the display to display a user interface (UI) notifying that an error occurs in the first driving module.

A part of supply power of the second driving module supplied to the first display module may correspond to half of power consumption of the first display module, a remainder of the supply power of the first driving module supplied to the first display may correspond to half of power consumption of the first display module, a part of supply power of the first driving module supplied to the second display module may correspond to half of power consumption of the second display module, and a remainder of supply power of the second driving module supplied to the second display module may correspond to half of power consumption of the second display module.

The second display module may be a module spaced apart from the first display module by a predetermined number of display modules, and the first driving module may be connected to the second driving module.

The display may include the plurality of display modules disposed in a format of N*M, and the second display module may be spaced apart from the first display module by M/2 number of display modules in a horizontal direction, or the second display module may be spaced apart from the first display module by N/2 number of display modules in a vertical direction.

Based on the input image having a brightness value greater than or equal to a predetermined size being output from at least one of the first display module and the second display module, the processor may be configured to obtain the supply power of each of the first driving module and the second driving module, and to control the first driving module and the second driving module on the obtained supply power.

Each of the first display module and the second display module may be implemented as a light emitting diode (LED) module including at least one LED element or an LED cabinet in which a plurality of LED modules is connected.

According to an example embodiment, a method of controlling a display apparatus including a first display module, a second display module, a first driving module connected to the first display module, and a second driving module connected to the second display module includes: obtaining total power consumption of the first display module and second display module based on a brightness of an input image, obtaining supply power of each of the first driving module and second driving module based on the obtained total power consumption, and controlling the first driving module and the second driving module based on the obtained supply power, and the controlling the first driving module and the second driving module may include controlling so that a part of supply power of the first driving module is supplied to the second display module based on power consumption of the first di splay module.

The obtaining the total power consumption may include obtaining the total power consumption based on individual power consumption of the first display module and the second display module, and the obtaining the supply power may include obtaining the supply power of each of the first driving module and second driving module by bisecting (e.g., averaging) the total power consumption.

The controlling the first driving module and the second driving module may include controlling so that a remainder of the supply power of the first driving module is supplied to the first display module, and controlling so that a part of the supply power of the second driving module is supplied to the first display module and a remainder is supplied to the second display module based on power consumption of the second display module.

The display apparatus may include a switch connected to each of the first driving module and the second driving module, and the method may include, based on an error being identified in the first driving module, blocking supply power of the first driving module to be supplied to the first display module and the second display module by controlling a first switch connected to the first driving module, and the first display module may be driven based on the supply power supplied from the second driving module.

The controlling method may include displaying a user interface (UI) notifying that an error occurs in the first driving module.

A part of supply power of the second driving module supplied to the first display module may correspond to half of power consumption of the first display module, a remainder of supply power of the first driving module supplied to the first display may correspond to half of power consumption of the first display module, a part of supply power of the first driving module supplied to the second display module may correspond to half of power consumption of the second display module, and a remainder of supply power of the second driving module supplied to the second display module may correspond to half of power consumption of the second display module.

The second display module may be a module spaced apart from the first display module by the predetermined number of display modules, and the first driving module may be connected to the second driving module.

The display apparatus may include the plurality of display modules disposed in a format of N*M, and the second display module may be spaced apart from the first display module by M/2 number of display modules in a horizontal direction, or the second display module may be spaced apart from the first display module by N/2 number of display modules in a vertical direction.

The obtaining supply power of each of the first driving module and the second driving module may include, based on the input image having a brightness value greater than or equal to a predetermined size being output from at least one of the first display module and the second display module, obtain the supply power of each of the first driving module and the second driving module.

Each of the first display module and the second display module may be implemented as a light emitting diode (LED) module including at least one LED element or an LED cabinet in which a plurality of LED modules is connected.

According to various example embodiments, a display apparatus including of a plurality of display apparatuses may efficiently provide supply power through power sharing between a plurality of display modules, and avoid a problem of generating heat in a particular driving module. In addition, the peak brightness may be efficiently implemented.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
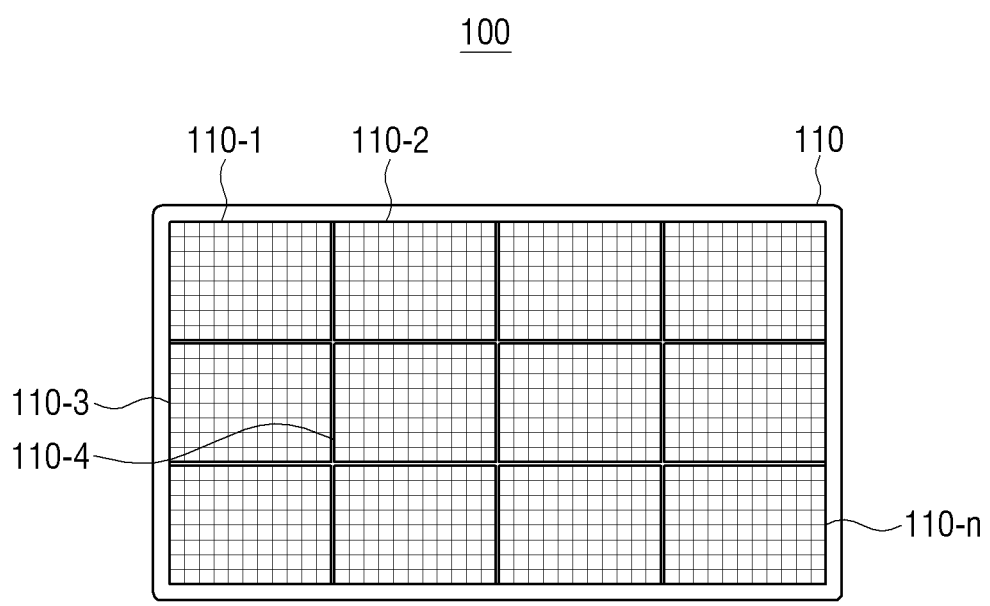
FIG. 1 is a diagram illustrating an example configuration of a display apparatus according to an embodiment.

Terms used in the present disclosure are briefly described, and the present disclosure will then be described in greater detail with reference to the drawings.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms may be arbitrarily chosen. In this case, such terms will be described in detail in a corresponding description portion of the disclosure. Therefore, the terms used in embodiments of the disclosure should be understood based on the meaning of the terms and the contents throughout the disclosure rather than simple names of the terms.

Since the disclosure may be variously modified and have several embodiments, specific embodiments of the disclosure will be illustrated in the drawings and be described in detail in the disclosure. However, it is to be understood that the disclosure is not limited to specific example embodiments, but includes all modifications, equivalents, and substitutions without departing from the scope and spirit of the disclosure. When it is decided that a detailed description for the known art related to the disclosure may obscure the gist of the disclosure, the detailed description of such known or related art may be omitted.

Terms 'first', 'second', and the like, may be used to describe various components, but the components are not to be understood as being limited by the terms. The terms are used to distinguish one component from another component.

Singular forms are intended to include plural forms unless the context clearly indicates otherwise. It will be further understood that terms "include" or "formed of" used in the present disclosure may specify the presence of features, numerals, steps, operations, components, parts, or combinations thereof mentioned in the present specification, but do not preclude the presence or addition of one or more other features, numerals, steps, operations, components, parts, or combinations thereof.

In various example embodiments of the present disclosure, a 'module' or a '~er/~or' may perform at least one function or operation, and be implemented by hardware or software or be implemented by a combination of hardware and software. In addition, a plurality of 'modules' or a plurality of '~ers/~ors' may be integrated in at least one module and be implemented by at least one processor (not illustrated) except for a 'module' or a '~er/or' that needs to be implemented by specific hardware.

Hereinafter, various example embodiments of the disclosure will be described in greater detail with reference to the accompanying drawings. However, the disclosure may be implemented in various different forms and is not limited to embodiments described herein. In addition, in the drawings, portions unrelated to the description may be omitted, and similar portions will be denoted by similar reference numerals throughout the disclosure.

FIG. 1 is a diagram illustrating an example configuration of a display apparatus according to an embodiment.

According to FIG. 1, a display apparatus 100 according to an embodiment may be implemented as a format to physically connect a plurality of display modules 110-1, 110-2, 110-3, 110-4, 110-n, or the like. Each of the plurality of display modules 110-1, 110-2, 110-3, 110-4, 110-n, or the like, may include a plurality of pixels arranged in a matrix format, for example, self-emitting pixels. For example, the display modules 110-1, 110-2, 110-3, 110-4, 110-n, or the like, may be implemented as an LED module in which each of the plurality of pixels is implemented as the LED pixel or an LED cabinet in which a plurality of LED modules are connected, but the embodiment is not limited thereto. For example, the display module may be implemented, for example, and without limitation, as a liquid crystal display (LCD), organic LED (OLED), active-matrix OLED (AMO-LED), plasma display panel (PDP), quantum dot (QD), micro LED, or the like. Hereinafter, for convenience of description, a case where each of the plurality of display modules 110-1, 110-2, 110-3, 110-4, 110-n, or the like, is implemented as the LED cabinet will be described.

The display apparatus 100 may display an image with a high brightness as the current applied to the LED increases, and may determine the peak brightness of each display module based on rated power capacity that may be provided by the driving modules connected to each of the plurality of display modules 110-1, 110-2, 110-3, 110-4, 110-n, or the like, when the display 110 including a plurality of LED display modules (for example, LED cabinet) is used, generally.

Various embodiments of supplying power to a plurality of display modules through power sharing among a plurality of drive modules will be described. In addition, various example embodiments will be described in which the driving module supplies power to each display module, when the peak brightness is implemented in some regions of the display 110 including the plurality of display modules 110-1, 110-2, 110-3, 110-4, 110-n, or the like.

Figure 2:
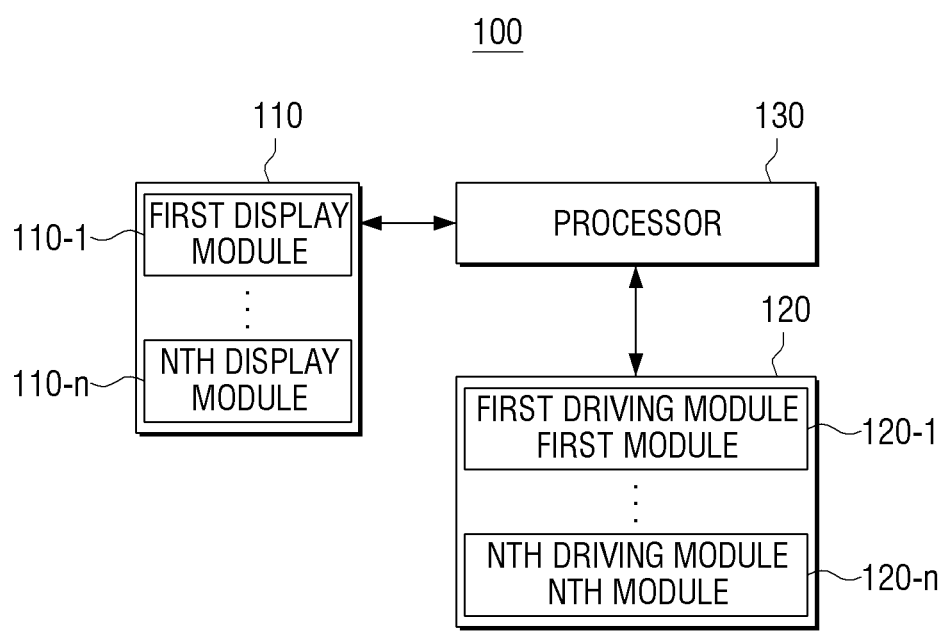
FIG. 2 is a block diagram illustrating an example configuration of a display apparatus according to an embodiment.

FIG. 2 is a block diagram illustrating an example configuration of a display apparatus according to an embodiment.

Referring to FIG. 2, the display apparatus 100 includes the display 110, a driving module (e.g., including driving circuitry) 120, and a processor (e.g., including processing circuitry) 130.

The display 110 includes a plurality of display modules 110-1, . . . , 110-n. For example, the display 110 may include a format in which the plurality of display modules 110-1 . . . 110-n are connected and assembled. For example, each of the plurality of display modules 110-1, . . . , 110-n may include a plurality of pixels arranged in a matrix form, for example, self-emitting pixels. According to an example embodiment, the display 110 may be implemented with a plurality of LED modules (LED modules including at least one LED element) and/or a plurality of LED cabinets.

A plurality of driving modules 120-1, . . . , 120-n drive the display 110 under the control of the processor 130.

The display apparatus 100 according to an embodiment may include a plurality of driving modules 120-1, . . . , 120-n connected to each of the plurality of display modules 110-1, . . . , 110-n. The plurality of LED driving modules drives the plurality of display modules 110-1, . . . , 110-n by supplying power to the plurality of display modules 110-1, . . . , 110-n to correspond to control of the processor 130 which will be described in greater detail below. For example, the display apparatus 100 may include the first driving module 120-1 connected to the first display module 110-1 and a second driving module 120-2 (not shown) connected to the second display module 110-2 (not shown).

Each of the plurality of driving modules 120-1, . . . , 120-n may include a power supply for supplying power. The power supply may include hardware which converts AC to DC so that the current may be stably used by each of the plurality of display modules 110-1, . . . , 110-n and supplies power to be suitable for each system. The power supply may include an AC-DC rectifier, a DC-DC switching converter, an output filter, and an output. The power supply may be implemented, for example, as a switched mode power supply (SMPS). The SMPS is a DC stabilizing power device which stabilizes output by controlling on-off time of a semiconductor switch element, which may be highly efficient, small-sized, and light-weighted. Therefore, the SMPS may be used to drive each of the plurality of display modules 110-1, . . . , 110-n. The power supply according to an embodiment may include electro-magnetic interference (EMI) filter, or the like. For example, the power supply may remove electric noise of normal power through the EMI filter.

The first driving module 120-1 according to an embodiment may provide the supply power to the first display module 110-1 connected to the first driving module 120-1 under the control of the processor 130. In other words, the first driving module 120-1 drives each LED pixel by applying a driving voltage to the first display module 110-1 to drive each of the self-emitting elements including the first display module 110-1, for example, LED pixels, or enabling the driving current to flow.

According to an embodiment, the first driving module 120-1 and the second driving module 120-2, among a plurality of driving modules 120-1, . . . , 120-n may be interconnected. For example, the first driving module 120-1 and the second driving module 120-2 may be connected through a separate IC chip or a specific signal line.

According to an embodiment, the first and second driving modules 120-1 and 120-2 may exchange information on individual power consumption of the first and second display modules 110-1 and 110-2 and supply power of each of the first and second driving modules 120-1 and 120-2 using a pin on the IC chip. For example, the first driving module 120-1 may obtain at least one of the individual power consumption of the second display module 110-2 and the supply power of the second driving module 120-2 from the second driving module 120-2.

As another example, the first driving module 120-1 may be connected not only to the first display module 110-1 but also to the second display module 110-2, and the second driving module 120-2 may be connected not only to the second display module 110-2 but also the first display module 110-1. As still another example, the first display module 110-1 and the second display module 110-2 may be interconnected.

The power supply of each of the first driving module 120-1 and the second driving module 120-2 may be shared.

For example, some of the supply power of the first driving module 120-1 may be provided to the second display module 110-2 under control of the processor 130. In addition, the rest of the supply power of the first driving module 120-1 may be provided to the first display module 110-1.

As another example, some of the supply power of the second driving module 120-2 may be provided to the first display module 110-1 under control of the processor 130, and a remainder of the supply power may be provided to the second display module 110-2.

According to an embodiment, the first display module 110-1 may be driven according to the supply power provided from the first driving module 120-1 and the supply power provided from the second driving module 120-2. The second display module 110-2 may be driven according to the supply power provided from the second driving module 120-2 and the supply power provided from the first driving module 120-1. In other words, the first display module 110-1 may not be driven using only the supply power provided from the first driving module 120-1 but may be driven using the supply power provided from each of the first and second driving modules 120-1 and 120-2. The second display module 110-2, as well, may not be driven only by the supply power provided from the second driving module 120-2 but also using the supply power provided from each of the first and second driving modules 120-1 and 120-2.

The processor 130 may include various processing circuitry and control operations of the display apparatus 100 overall according to an embodiment.

According to an embodiment, the processor 130 may include various processing circuitry, such as, for example, and without limitation, one or more among a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 130 may be implemented in a system on chip (SoC) type or a large scale integration (LSI) type which a processing algorithm is built therein or in a field programmable gate array (FPGA) type.

According to an embodiment, the processor 130 may obtain total power consumption based on the individual power consumption of the plurality of display modules 110-1, . . . , **110-*n*. In addition, the processor 130 may calculate the total power capacity that can be supplied by the sum of the respective rated power capacities of each of the plurality of driving modules 120-1, . . . , 120-*n***.

For example, the processor 130 may obtain individual power consumption of the first and second display modules 110-1 and 110-2 based on the brightness of the input image, and obtain the total power consumption of the first and second display modules 110-1 and 110-2 by the sum of the individual power consumption.

The processor 130 may obtain the supply power of the first and second driving modules 120-1, . . . , **120-*n* connected to each of the first and second display modules based on the total power consumption of the first and second display modules 110-1 and 110-2**.

As an example, if the power consumption by the first display module 110-1 is 100 W and the power consumption by the second display module 110-2 is 50 W according to the brightness of the input image, the processor 130 may obtain 150 W of the total power consumption. The processor 130 may control the first and second driving modules 120-1 and 120-2 so that the sum of the supply power of the first and second driving modules 120-1 and 120-2 becomes 150 W. In other words, the sum of the supply power provided to the first and second display modules 110-1 and 110-2 in the first and second driving modules 120-1 and 120-2 may be 150 W.

The first and second driving modules 120-1 and 120-2 may be connected to each other. For example, the first driving modules 120-1 and 120-2 may exchange information on the individual power consumption of the first and second display modules 110-1 and 110-2 and the supply power of the first and second driving modules 120-1 and 120-2 using a specific pin on the IC chip provided on the display apparatus 100.

According to an example embodiment, the processor 130 may control the display apparatus so that some of the supply power of the first driving module 120-1 is provided to the second display module 110-2 based on the power consumption of the first display module 110-2. In addition, the processor 130 may control the display apparatus so that the remainder of the supply power of the first driving module 120-1 is provided to the first display module 110-1.

As another example, the processor 130 may control the display apparatus so that a part of the supply power of the second driving module 120-2 is provided to the first display module 110-1 based on the power consumption of the second display module 110-1. In addition, the processor 130 may control the display apparatus so that the remainder of the supply power of the second driving module 120-2 is provided to the second display module 110-2.

The processor 130 according to an embodiment may obtain the supply power of each of the first and second driving modules 120-1 and 120-2 by bisecting (e.g., averaging) the total power consumption. For example, the processor 130 may obtain the total power consumption of 150 W by summing the individual power consumption of 100 W and 50 W of the first and second display modules 110-1 and 110-2, respectively. The processor 130 may bisect (e.g., average) the total power consumption 150 W to obtain the supply power 75 W of each of the first and second driving modules 120-1 and 120-2. Each of the first and second driving modules 120-1 and 120-2 may supply 75 W of power under the control of the processor 130. According to an example embodiment, the supply power of each of the first and second driving modules 120-1 and 120-2 may be determined by bisecting (e.g., averaging) the total power consumption under the control of the processor 130, and the embodiment is not limited thereto.

For example, the processor 130 may control the first and second driving modules 120-1 and 120-2 so that supply power of each of the first driving module 120-1 and the second driving module 120-2 are in proportion to the rated power capacity of each of the first driving module 120-1 and the second driving module 120-2. As another example, the processor 130 may control the display apparatus so that any one of the first driving module 120-1 and the second driving module 120-2 supplies power that is relatively larger than the other, based on the use history, remaining capacity, remaining life of the first driving module 120-1 and the second driving module 120-2.

According to an example embodiment, the processor 130 may control the display apparatus so that a part of the supply power of the first driving module 110-1 is provided to the second display module 110-2, and the remainder is provided to the first display module 110-2. For example, 25 W, which is a part of the supply power 75 W of the first driving module 120-1, may be provided to the second display module 110-2 and the remaining 50 W may be provided to the first display module 110-1. In addition, 50 W, which is a part of the supply power 75 W of the second driving module 120-2, may be provided to the first display module 110-1 and the remaining 25 W may be provided to the second display module 110-2.

Accordingly, 100 W which is the individual power consumption of the first display module 110-1 may be provided from the first driving module 110-1 by 50 W and from the second driving module 110-2 by 50 W, and the individual power consumption of the second display module 110-2 may be provided from the second driving module 110-2 by 25 W and from the first driving module 110-1 by 25 W.

In the related-art display apparatus, a display module may not realize the peak brightness, if the driving module connected to the display module cannot supply power required for the output of the peak brightness output of the display module, and the display device cannot but help degrading, distorting, or relatively darkening the brightness of the input image and output the image. Accordingly, a driving module connected to each of the related-art plurality of display modules must include a power supply, SMPS, of which rated capacity (or rated output) is relatively high in order to supply power required to output the peak brightness in order to implement the peak brightness of the display module. However, this has a problem in that a manufacturing cost of a display apparatus increases, and the remaining life of the driving module provided in a region which requires output of the peak brightness output and the remaining life of the driving module provided in another region is different.

The driving module according to an embodiment may perform power sharing with another driving module, and may receive supply power amount required to implement the peak brightness of the display module from another driving module, instead of supplying the required power amount by itself.

The feature that the processor 130 obtains the total power consumption based on the individual power consumption of the display module, and obtains supply power of each of the driving module by bisecting (e.g., averaging) the total power consumption is an example embodiment, and the embodiment is not limited thereto. For example, the first to third driving modules 120-1, 120-2, and 120-3 connected to each of the first to third display modules 110-1, 110-2, and 110-3 may be connected to each other, and the processor 130 may obtain the total power consumption by summing up individual power consumption of each of the first to third display modules 110-1, 110-2, and 110-3, and obtain supply power of each of the first to third driving modules 120-1, 120-2, and 120-3 by trisecting (e.g., averaging) the total power consumption. In other words, the processor 130 may obtain supply power of each of the plurality of driving modules 120-1, ..., 120-n based on the connection format among the plurality of driving modules 120-1, ..., 120-n corresponding to each of the plurality of display modules 110-1, ..., 110-n. The specific description will be given with respect to FIGS. 5 and 6. Hereinbelow, it has been assumed that the driving modules (for example, the first and second driving modules 120-1 and 120-2) corresponding to each of the two display modules (for example, the first and second display modules 110-1 and 110-2) are connected, for convenient description. However, it will be understood that the disclosure is not limited thereto.

A part of the supply power of the first driving module 120-1 provided to the second display module 110-2 according to an embodiment may correspond to half of the individual power consumption of the second display module 110-2, and the remaining power of the second driving module 120-2 provided to the second display module 110-2 may correspond to half of the power consumption of the second display module 110-2.

For example, it may be assumed that the individual power consumption of the first display module 110-1 is 150 W, and the individual power consumption of the second display module 110-2 is 100 W. Each of the first driving module 120-1 and the second driving module 120-2 may supply power of 125 W. From among the supply power 125 W of the first driving module 120-1, 75 W which is half of the individual power consumption of the first display module 110-1 may be provided to the first display module 110-1, and 50 W which is half of the individual power consumption of the second display module 110-2 may be provided to the second display module 110-2.

From among the supply power 125 W of the second driving module 120-2, 50 W which corresponds to half of the individual power consumption of 75 W of the second display module 110-2 may be provided to the second display module, and 75 W which corresponds to half of the individual power consumption of the first display module 110-1 may be provided to the first display module 110-1.

For example, the feature that the part of supply power provided to the first display module 110-1 among the supplied power of the first driving module 120-1 corresponds to half of the individual power consumption of the first display module 110-1 and the remaining supply power provided to the second display module 110-2 corresponds to half of the individual power consumption of the second display module 110-2 is an embodiment and is not limited thereto. For example, from among the supply power of the first driving module 120-1, the supply power which is provided to the first display module 110-1 and then remains may be supplied to the second display module 110-2.

According to an embodiment, when an image having a brightness value that is greater than or equal to a predetermined size is output from at least one of the first and second display modules, the processor 130 may obtain the supply power of the first and second driving modules 120-1 and 120-2 and control the first and second driving modules 120-1 and 120-2 based on the obtained supply power.

For example, in order to output an input image, it may be assumed that implementation of the peak brightness is required in a 10% region including the region in which the first display module 110-1 is disposed, among the entire regions of the display 110. The first display module 110-1 may implement the peak brightness based only on the supply power of the first driving module 120-1 connected to the first display module 110-1. In this example, since the rated power capacity of the first driving module 120-1 must correspond to the power consumption required for the peak brightness output of the first display module 110-1, a high-capacity power supplier must be included. Also, relatively high heat generation may occur in the first driving module 120-1 as compared with the remaining driving modules (the second to $n^{th}$ driving modules 120-2, . . . , 120-n).

The display apparatus 100 according to an embodiment, when it is required to implement the peak brightness in a part of a region among the entire regions of the display 110, may receive supply power from the driving module corresponding to the display module disposed in a remaining region. For example, when the first display module 110-1 is required with high brightness output, the first display module 110-1 may be driven by receiving the supply power from the first driving module 120-1 and the second driving g module 120-2. Accordingly, even if the first driving module 120-1 does not necessarily supply power as much as the power consumption required for peak brightness output of the first display module 110-1, the first display module 110-1 may perform peak brightness output.

Figure 3:
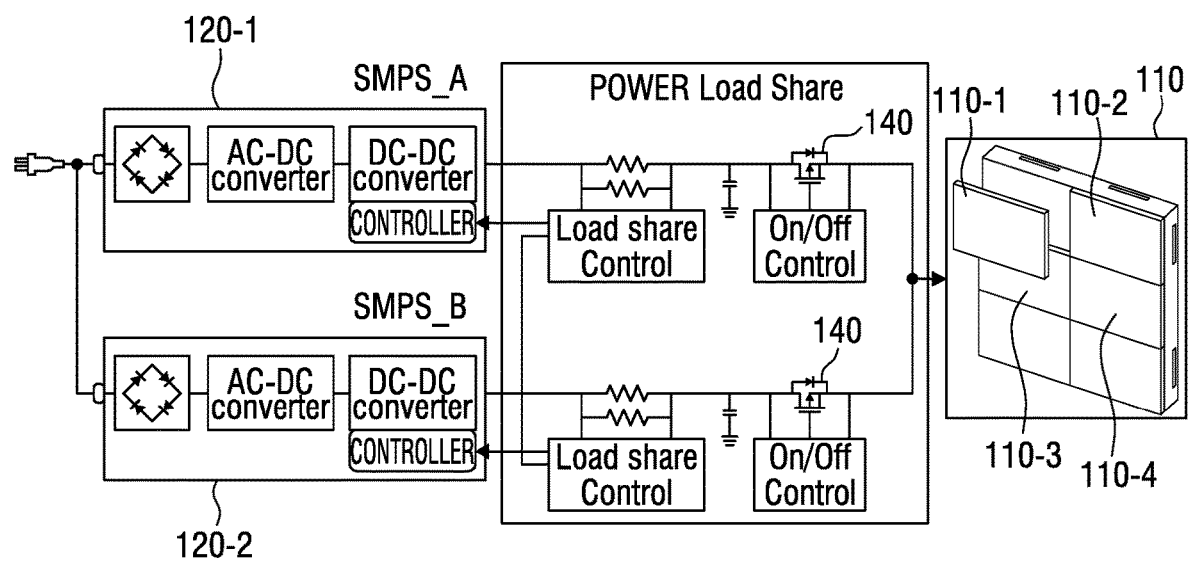
FIG. 3 is a diagram illustrating an example driving module according to an embodiment.

FIG. 3 is a diagram illustrating an example driving module according to an embodiment.

Referring to FIG. 3, the first driving module 120-1 and the second driving module 120-2 may be connected to each other. The processor 130 provided in the display apparatus 100 may perform an operation for power sharing among a plurality of display modules 110-1, . . . , 110-n according to various embodiments. However, the embodiment is not limited thereto, and the power sharing operation between the display modules may be performed according to the power sharing module included in the driving module.

As an example, each of the first driving module 120-1 and the second driving module 120-2 may include a power sharing module. Here, the module for power sharing may sum up individual power consumption of the first and second display modules 110-1 and 110-2, and obtain supply power of each driving module based on the total power consumption. For example, the power sharing module included in the first driving module 120-1 may obtain the total power consumption according to the individual power consumption of each of the first display module 110-1 connected to the first driving module 120-1 and the second display module 110-2 connected to the second driving module 120-2, and obtain supply power of the first driving module 120-1 by bisecting (e.g., averaging) the total power consumption.

The power sharing module included in the second driving module 120-2 may also obtain the supply power of the second driving module 120-2. Here, the power sharing module may be implemented as a sub-processor for controlling the operation of each driving module. In this example, each sub-processor may be implemented as hardware, software, firmware, any combination of hardware, software and firmware, an integrated chip (IC), or the like. According to an example embodiment, each sub-processor may be implemented as a separate semiconductor IC.

The display apparatus 100 according to an embodiment may include a switch 140 connected to each of a plurality of driving modules. Here, the switch 140 may block the supply power of the driving module 120 from being provided to the display 110 under the control of the processor 130. For example, the display apparatus 100 may include the switch 140 connected to each of the first driving module 120-1 and the second driving module 120-2.

For example, when an error is identified in the first driving module 120-1, the processor 130 may control a first switch 140-1 connected to the first driving module 120-1 to block providing the supply power of the driving module 120-1 to the first and second display modules 110-1 and 110-2. In this case, the first display module 110-1 may be driven based on the supply power provided from the second driving module 120-2.

In the related-art, when an error is identified in the first driving module 120-1, the first display module 110-1 connected to the first driving module 120-1 may not receive power. Accordingly, there is a problem that an image is not displayed (or a black screen is displayed) on a part of a region corresponding to the first display module 110-1 in the display 110.

In the display apparatus 100 according to the embodiment, even if an error occurs in the first driving module 120-1, the first display module 110-1 may be driven based on supply power provided from the second driving module 120-2. For example, the power provided from the second driving module 120-2 to the first display module 110-1 may correspond to half of the power consumption of the first display module 110-1. The power consumption amount corresponding to the output brightness of the first display module 110-1 may not be provided from the second driving module 120-2, but it may be avoided that an image is not displayed in some regions corresponding to the first display module 110-1, or a black screen is displayed.

Figure 4:
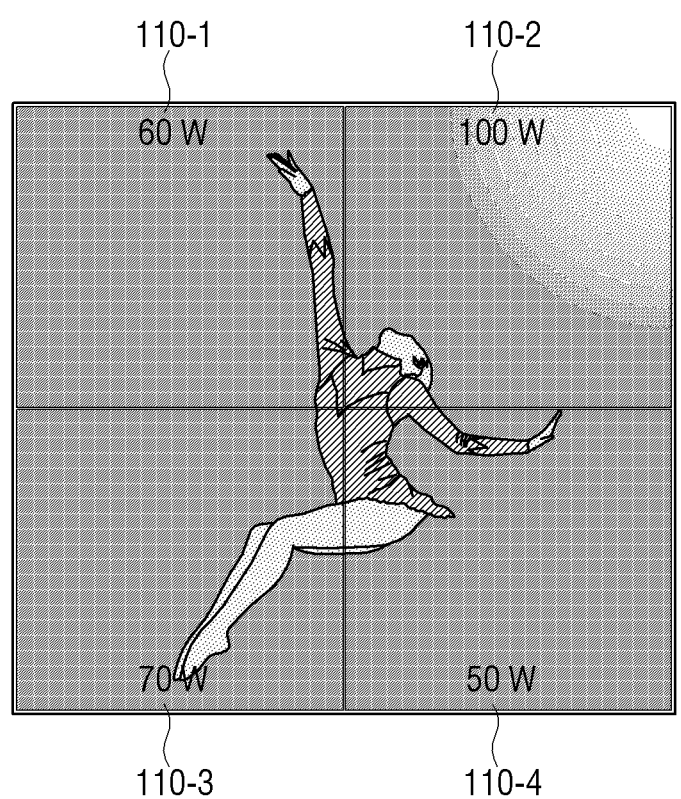
FIG. 4 is a diagram illustrating example power sharing according to an embodiment.

FIG. 4 is a diagram illustrating an example power sharing according to an embodiment.

Referring to FIG. 4, each of the first to fourth display modules 110-1, . . . , 110-4 has a different individual power consumption amount. For example, it may be assumed that the first display module 110-1 has individual power consumption of 60 W, the second display module 110-2 of 70 W, the third display module 110-3 of 100 W, and the fourth display module 110-4 of 50 W.

Here, the first driving module 120-1 corresponding to the first display module 110-1 and the second driving module 120-2 corresponding to the second display module 110-2 may be connected to each other, and the third driving module 120-3 corresponding to the third display module 110-3 and the fourth driving module 120-4 corresponding to the fourth display module 110-4 may be connected to each other.

The display apparatus 100 may obtain the total power consumption of 130 W based on the individual power consumption of 60 W of the first display module 110-1 and the individual power consumption 70 W of the second display module 110-2. Then, each of the first and second driving modules 120-1 and 120-2 may supply power of 65 W. Here, 30 W of the supply power 65 W of the first driving module 120-1 may be provided to the first display module 110-1 and 35 W may be provided to the second display module 110-2. Here, 30 W of the supply power 65 W of the second driving module 120-2 may be provided to the first display module 110-1 and 35 W may be provided to the second display module 110-2.

In addition, the display apparatus 100 may obtain the total power consumption 150 W based on the individual power consumption of 100 W of the third display module 110-3 and the individual power consumption of 50 W of the fourth display module 110-4. Then, each of the third and fourth driving modules 120-3 and 120-4 may supply power of 75 W. Among supply power 75 W of the third driving module 120-3, 50 W may be provided to the third display module 110-3, and 25 W may be provided to the fourth display module 110-4. Among the supply power 75 W of the fourth driving module 120-4, 50 W may be provided to the third display module 110-3, and 25 W may be provided to the fourth display module 110-4.

Connection of the first driving module 120-1 and the second driving module 120-2 and the connection of the third driving module 120-3 and the fourth driving module 120-4 is an example embodiment and is not necessarily limited thereto. For example, the driving modules may be connected in a vertical direction instead of a horizontal direction. For example, the first driving module 120-1 and the third driving module 120-3 may be connected, and the second driving module 120-2 and the fourth driving module 120-4 may be connected.

Figure 5:
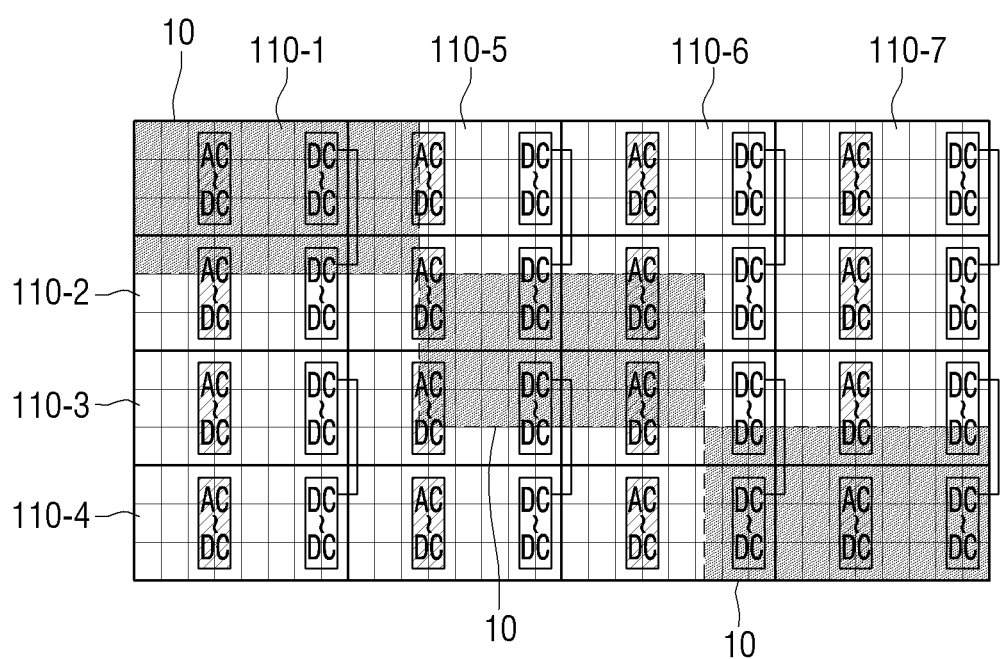
FIGS. 5 and 6 are diagrams illustrating example connections among driving modules according to an embodiment.
Figure 6:
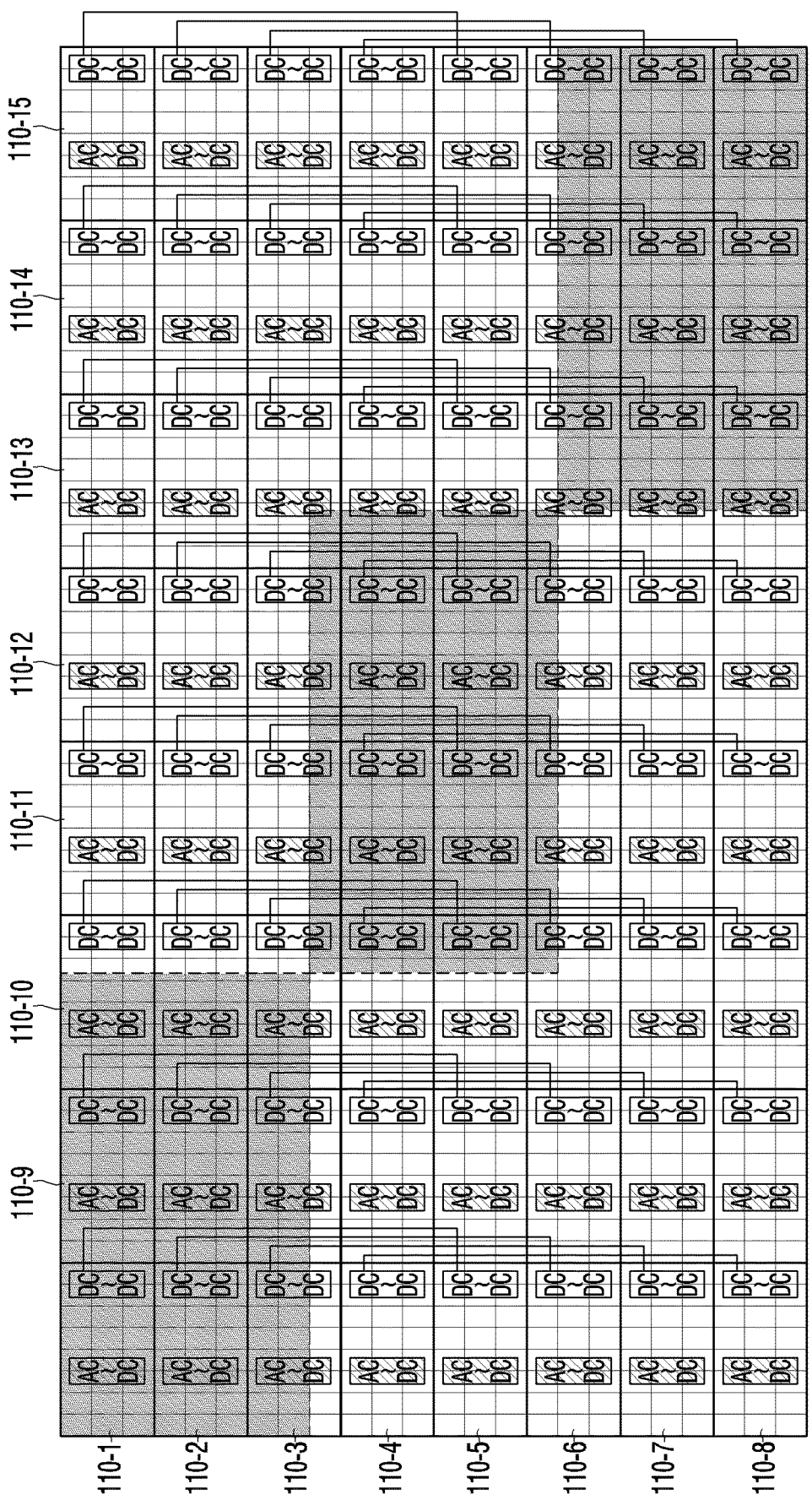

FIGS. 5 and 6 are diagrams illustrating example connections among driving modules according to an embodiment.

Referring to FIG. 5, the display 110 may include a plurality of display modules arranged in the format of N*M. As an example, the display 110 having a resolution of 4K may include a plurality of display modules 110-1, 110-2, . . . , 110-15. The embodiment is not limited thereto, and the display 110 having a resolution of 4K may include a plurality of display modules 110-1, . . . , 110-n disposed in various formats.

According to an embodiment, the second display module 110-2 which shares power with the first display module 110-1 may be spaced apart from each other by the display modules in the predetermined number. Referring to FIG. 5, the first display module 110-1 may share power with the second display module 110-2 which is adjacent in a vertical direction. For example, the first driving module 120-1 corresponding to the first display module 110-1 may be connected to the second driving module 120-2 corresponding to the second display module 110-2. In addition, the third driving module 120-3 corresponding to the third display module 110-3 may be connected to the fourth driving module 120-4 corresponding to the fourth display module 110-4.

In this example, the supply power of the first driving module 120-1 may be supplied to the first and second display modules 110-1 and 110-2, and the supply power of the second driving module 120-2 may be supplied to the first and second displays 110-1 and 110-2.

The supply power of the third driving module 120-3 may be provided to the third and fourth display modules 110-3 and 110-4, and the supply power of the fourth driving module 120-4 may be provided to the third and fourth displays 110-3 and 110-4.

According to an embodiment, when an image having a brightness value that is greater than or equal to a predetermined size is output in a part of a region among the entire region of the display 110, the display apparatus 100 may obtain the information on supply power amount of each of the driving modules and adjacent driving modules based on the power consumption amount of the region.

For example, if a maximum brightness output is required in the region 10 corresponding to 10% of the entire region of the display 110, the display apparatus 100 may obtain the total power consumption based on individual power consumption of each of the first display module 110-1 included in the region 10 corresponding to 10% and the second display module 110-2 adjacent to the first display module 110-1, and control the first and second driving modules 120-1 and 120-2 so that the sum of the supply power of the first driving module 120-1 and the supply power of the second driving module 120-2 corresponds to the total power consumption amount.

As another example, the first display module 110-1 may share power with the third display module 110-3, which is spaced apart by one display module in the vertical direction. Specifically, the first driving module 120-1 corresponding to the first display module 110-1 and the third driving module 120-3 corresponding to the third display module 110-3 may be connected to each other. The second driving module 120-2 corresponding to the second display module 110-2 and the fourth driving module 120-4 corresponding to the fourth display module 110-4 may be connected.

As another example, the first display module 110-1 may share power with the fifth display module 110-5 adjacent in the horizontal direction. Specifically, the first driving module 120-1 corresponding to the first display module 110-1 and the fifth driving module 120-5 corresponding to the fifth display module 110-5 may be connected to each other. That is, the power sharing between adjacent display modules in the vertical direction is an example, and the embodiment is not limited thereto. According to various embodiments, power sharing between two display modules which are disposed to be adjacent with each other or spaced apart from each other, in the vertical or horizontal direction.

Referring to FIG. 6, the display 110 having a resolution of 8K may include a plurality of display modules 110-1, . . . , 110-64 disposed in a format of 8*8. The embodiment is not limited thereto and may include a plurality of display modules 110-1, . . . , 110-n disposed in various formats having a resolution of 8K.

According to an embodiment, the second display module 110-2 which shares supply power with the first display module 110-1 may be a module which is spaced apart from the first display module 110-1 by the display module in the number of N/2 in the vertical direction.

For example, referring to FIG. 6, the first display module 110-1 may share supply power with the fifth display module 110-5 which is spaced apart from the first display module 110-1 by four display modules in vertical direction.

For example, the first driving module 120-1 corresponding to the first display module 110-1 and the fifth driving module 120-5 corresponding to the fifth display module 110-5 may be connected. The second driving module 120-2 corresponding to the second display module 110-2 and the sixth driving module 120-6 corresponding to the sixth display module 110-6 may be connected. The third driving module 120-3 corresponding to the third display module 110-3 and the seventh driving module 120-7 corresponding to the seventh display module 110-7 may be connected. The fourth driving module 120-4 corresponding to the fourth display module 110-4 and the eighth driving module 120-8 corresponding to the eighth display module 110-8 may be connected.

As another example, the second display module 110-2 which shares supply power with the first display module 110-1 may be a module that is spaced apart from the first display module 110-1 by the display modules in the number of M/2 in the horizontal direction.

The first display module 110-1 may share supply power with the twelfth display module 110-12 spaced apart from the first display module 110-1 by four display modules in a horizontal direction.

For example, the first driving module 120-1 corresponding to the first display module 110-1 and the twelfth driving module 120-12 corresponding to the twelfth display module 110-12 may be connected. The ninth driving module 120-9 corresponding to the ninth display module 110-9 and the twelfth driving module 120-12 corresponding to the twelfth display module 110-12 may be connected. A tenth driving module 120-10 corresponding to the tenth display module 110-10 and a thirteenth driving module 120-13 corresponding to the thirteenth display module 110-13 may be connected. An eleventh driving module 120-11 corresponding to the eleventh display module 110-11 and a fifteenth driving module 120-15 corresponding to the fifteenth display module 110-15 may be connected.

It is assumed that the resolution of the display 110 is 8K and a part of the display 110 outputs the peak brightness according to an embodiment. For example, if a peak brightness output is required for some region (for example, 10%) of the entire region of the display 110, the first display module 110-1 may not share supply power with another display module adjacent in a vertical direction. The another display module (for example, the second display module 110-2) adjacent to the first display module 110-1 in a horizontal direction or a vertical direction also requires the peak brightness output. Both the first driving module 120-1 connected to the first display module 110-1 and the second driving module 120-2 connected to the second display module 110-2 need to supply power of a maximum value. Accordingly, when the resolution of the display 110 is greater than or equal to a predetermined resolution, the first display module 110-1 may share power with a module spaced apart from the first display module 110-1 by the display module in the predetermined number.

The power sharing of the first display module 110-1 with a display module that is spaced apart by the display modules in the number of M/2 in a horizontal direction, or power sharing with a display module that is spaced apart by the display modules in the number of N/2 in a vertical direction is not necessarily limited thereto. For example, the first display module 110-1 may share power with any one of the display modules other than the display module included in the predetermined size region (for example, 10%) of the entire region of the display 110.

The display apparatus 100 according to various embodiments may, in order to output a part of a region with a higher brightness than a rest of a region of the display 110, provide supply power of the driving module corresponding to the remainder of a region to a display module corresponding to the part of a region. The display apparatus 100 according to an embodiment may output a part of the region with the peak brightness or satisfy high dynamic range (HDR) through power sharing.

The display apparatus 100 according to another embodiment may perform power sharing when the brightness of the input image is equal to or larger than a predetermined size. For example, the supply power of the first driving module may be provided to the first display module, and the supply power of the second driving module may be provided to the second display module. Then, when a peak brightness output is requested in a part of the display 110 according to the brightness of the input image, the display apparatus 100 may perform power sharing. A part of the supply power of the first driving module 120-1 may be supplied to the second display module 110-2 and the remaining power of the first driving module 120-1 may be supplied to the first display module 110-2. A part of the supply power of the second driving module 120-2 may be supplied to the first display module 110-1 and the remainder of the supply power of the second driving module 120-2 may be supplied to the second display module 110-1. Here, the predetermined size may be variously set according to the purpose of the manufacturer, the user setting, the characteristics of the input image, the peak brightness, or the like. For example, when the display apparatus 100 outputs an input image, if brightness output of a candela (Cd/m$^2$) or nit equal to or greater than a predetermined value is required in one region of the display 110, power sharing may be performed. For example, if the brightness output of 1000 nits is required in one region of the display 110, power sharing may be performed. However, 1000 nits are merely an example and is not necessarily limited thereto. For example, when the brightness output of 500 nits is requested, the display apparatus 100 may perform power sharing.

As another example, the display apparatus 100 may perform power sharing for a predetermined time. For example, the display apparatus 100 may perform power sharing while the display apparatus 100 is being driven, or perform power sharing only for a predetermined time.

Figure 7A:
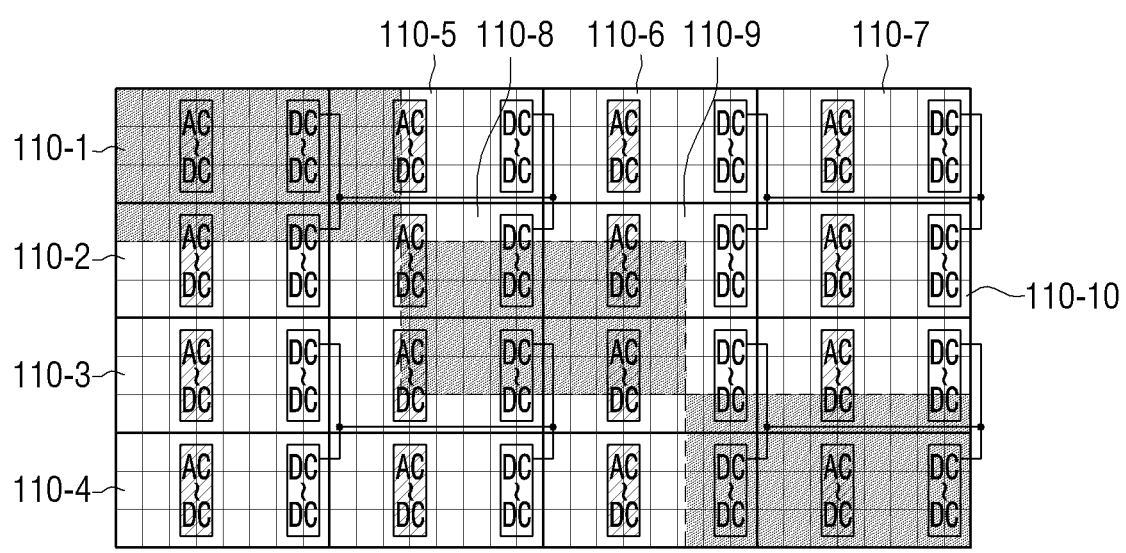
FIGS. 7A, 7B, and 7C are diagrams illustrating example connections among driving modules according to another embodiment.
Figure 7B:
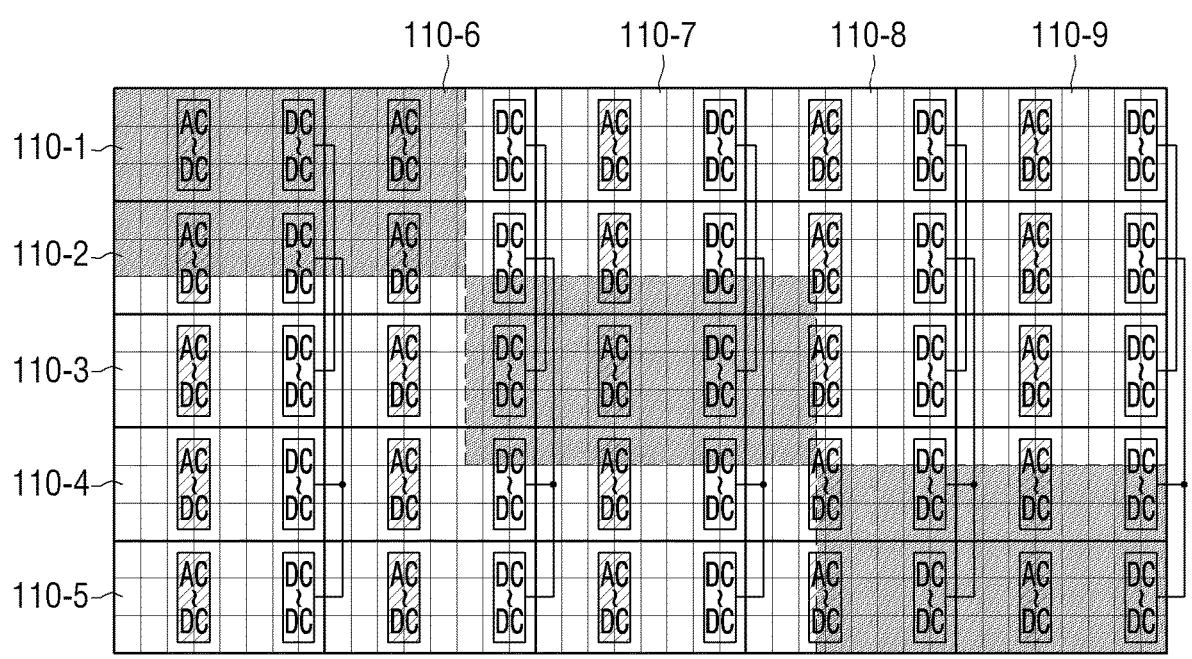
Figure 7C:
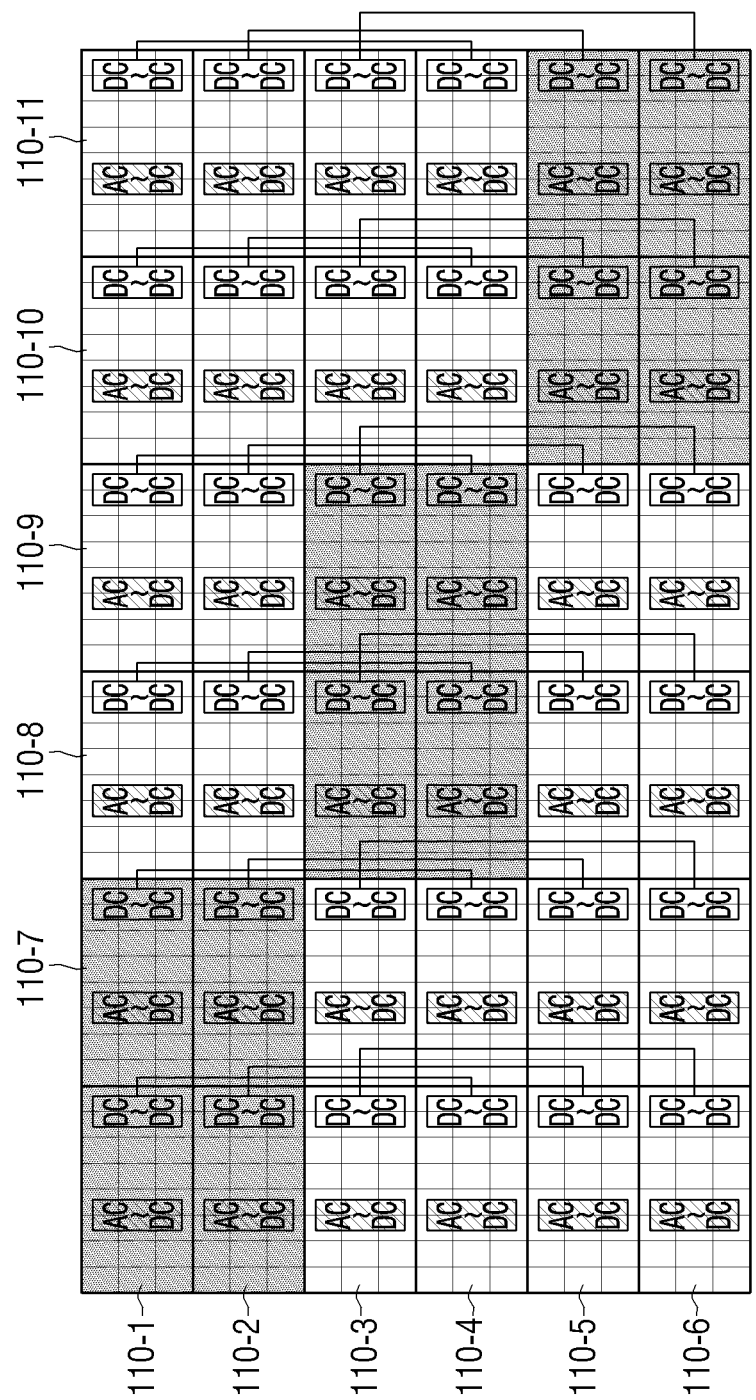

FIGS. 7A, 7B, and 7C are diagrams illustrating example connections among driving modules according to another embodiment.

Referring to FIG. 7A, four display modules may perform sharing of supply power. For example, the first display module 110-1, the second display module 110-2, the fifth display module 110-5, and the eighth display module 110-8 may share the supply power. The first driving module 110-1 may supply power to the first, second, fifth and eighth display modules 110-1, 110-2, 110-5 and 110-8, and the second driving module 110-2 may supply power to the first, second, fifth, and eighth display modules 110-1, 110-2, 110-5, and 110-8, and the fifth driving module 110-5 may supply power to the first, second, fifth, and eighth display modules 110-1, 110-2, 110-5, 110-8, and the eighth driving module 110-8 may supply power to the first, second, fifth, and eighth display modules 110-1, 110-2, 110-5, and 110-8. For example, the individual power consumption of the first, second, fifth, and eighth display modules 110-1, 110-2, 110-5, and 110-8 may be summed to obtain total power consumption. Then, by quadrisecting (e.g., averaging) the total power consumption, it is possible to determine the amount of power each of the first, second, fifth, and eighth driving modules 120-1, 120-2, 120-5, and 120-8 should supply. Power as much as the quadrisected (e.g., averaged) individual power consumption of the first display module 110-1 may be supplied from the first driving module 120-1. Also, the first display module 110-1 may receive power as much as the quadrisected (e.g., averaged) individual power consumption of the first display module 110-1 from the second, fifth, and eighth driving modules 120-2, 120-5, and 120-8. The second display module 110-2 may receive the power as much as the quadrisected (e.g., averaged) individual power consumption of the second display module 110-2 from each of the first, second, fifth, and eighth driving modules 120-1, 120-2, 120-5, and 120-8. In addition, each of the fifth and eighth display modules 110-5 and 110-8 may receive power from the first, second, fifth, and eighth driving modules 120-1, 120-2, 120-5, and 120-8. Here, supplying the power as much as the quadrisected (e.g., averaged) individual power consumption by the driving module 120 to the display module 110 is an embodiment, and is not necessarily limited thereto. In an example, a specific driving module may supply relatively larger power to a display module than a rest of driving modules according to a remaining life, a purpose of a manufacturer, a user setting, a characteristic of an input image, or the like.

Referring to FIG. 7B, two display modules may share the supply power while at the same time, three display modules may share the supply power. For example, the first and third display modules 110-1 and 110-3 may share the supply power and the second, fourth and fifth display modules 110-2, 110-4 and 110-5 may share the supply power. For example, the individual power consumption of the first and third display modules 110-1 and 110-3 may be summed to obtain the total power consumption. Then, the display apparatus 100 may determine the amount of power that the first and third drive modules 120-1 and 120-3 should supply by bisecting (e.g., averaging) the total power consumption. A part of the individual power consumption of the first display module 110-1 may be supplied from the first driving module 120-1 and the remaining power may be supplied from the third driving module 120-3. In addition, a part of the power consumption of the third display module 110-3 may be supplied from the third driving module 120-3, and the remaining power may be supplied from the first driving module 120-1.

According to an embodiment, the display apparatus 100 may obtain the total power consumption by summing the individual power consumption of the second, fourth, and fifth display modules 110-2, 110-4, and 110-5. Then, the display apparatus 100 may determine the amount of power that each of the second, fourth, and fifth driving modules 120-2, 120-4, and 120-5 should supply by trisecting (e.g., averaging) the total power consumption. Power as much as the trisected (e.g., averaged) individual power consumption of the second display module 110-2 may be supplied from the second driving module 120-2. In addition, the second display module 110-2 may receive power from the fourth and fifth driving modules 120-4 and 120-5 as much as the trisected (e.g., averaged) individual power consumption of the second display module 110-1. The fourth display module 110-2 may receive power as much as trisected (e.g., averaged) individual power consumption of the fourth display module 110-4 from each of the second, fourth, and fifth driving modules 120-2, 120-4, and 120-5. The fifth display module 110-5 may receive power as much as the trisected (e.g., averaged) individual power consumption of the fifth display module 110-4 from each of the second, fourth, and fifth drive modules 120-2, 120-4, and 120-5. Here, the configuration in which the driving module 120 supplies power equivalent to the trisected (e.g., averaged) total power consumption to the display module 110 is an embodiment, and is not limited thereto. For example, a specific driving module may supply relatively larger power to the display module than the remaining driving modules depending on the remaining lifetime of the driving module 120, the purpose of the manufacturer, the user's setting, a characteristic of an input image, or the like.

Referring to FIG. 7C, two display modules may share supply power. For example, the first and fourth display modules 110-1 and 110-4 may share supply power, the second and fifth display modules 110-2 and 110-5 may share supply power, and the third and sixth display modules 110-3 and 110-6 may share supply power.

According to an embodiment, it is assumed that a brightness output of a predetermined value or more is required in one region of the display module 110 including a region corresponding to the first display module 110-1. In this case, the display apparatus 100 may perform power sharing. For example, the first display module 110-1 may receive a part of the individual power consumption of the first display module 110-1 from the first driving module 120-1, and receive the remainder from the fourth driving module 120-4.

For example, in outputting an input image, the display apparatus 100 may perform power sharing when output of a peak brightness or brightness which is greater than or equal to a predetermined value in one region of the display module 110.

As another example, power sharing may be performed for a predetermined time. For example, the power sharing may be performed throughout the driving of the display apparatus 100, or the power sharing may be performed after the display apparatus 100 is driven and a predetermined time has elapsed. As another example, power sharing may be performed only for a predetermined time after a predetermined time has passed.

Figure 8:
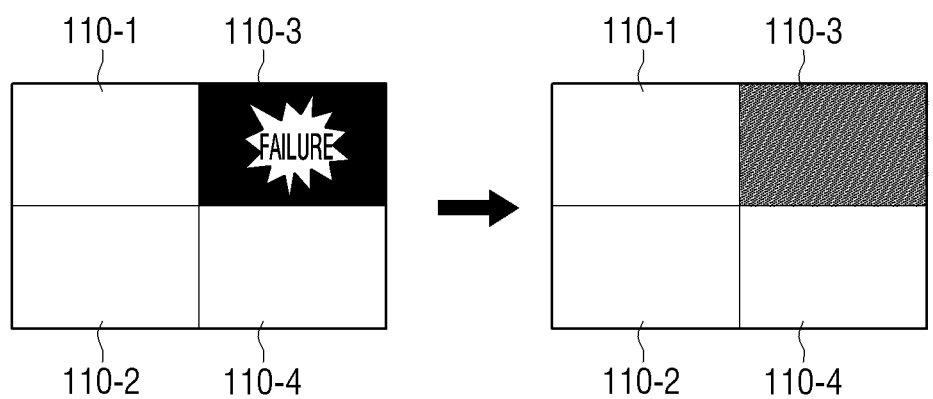
FIG. 8 is a diagram illustrating an example driving module according to an embodiment.

FIG. 8 is a diagram illustrating an example driving module according to an embodiment.

Referring to FIG. 8, in the related-art, when an error is detected or a failure occurs in the third driving module 120-3, the third display module 110-3 connected to the third driving module 120-3 could not receive power. Accordingly, there is a problem that an image is not displayed on a part of the display 110 corresponding to the third display module 110-3 (or a black screen is displayed).

The display apparatus 100 according to an embodiment may, even if an error occurs in the third driving module 120-3, drive the third display module 110-3 using supply power provided from the fourth driving module 120-4.

In this case, the supply power provided from the fourth driving module 120-4 to the third display module 110-3 may correspond half of the power consumption of the third display module 110-3. Accordingly, it may be avoided that an image is not displayed on a region corresponding to the third display module 110-3, or a black screen is displayed, but the third display module 110-3 may output a screen which is relatively dark compared to a remainder of a display module.

Even if an error occurs in the driving module, the display apparatus 100 may output an image using all the display modules until a repair or the like is performed on the driving module. The processor 130 according to an embodiment may output the UI notifying that an error has occurred in the driving module through the display 110. Here, the UI notifying that an error has occurred may include information on a driving module in which an error has occurred among a plurality of driving modules.

Figure 9A:
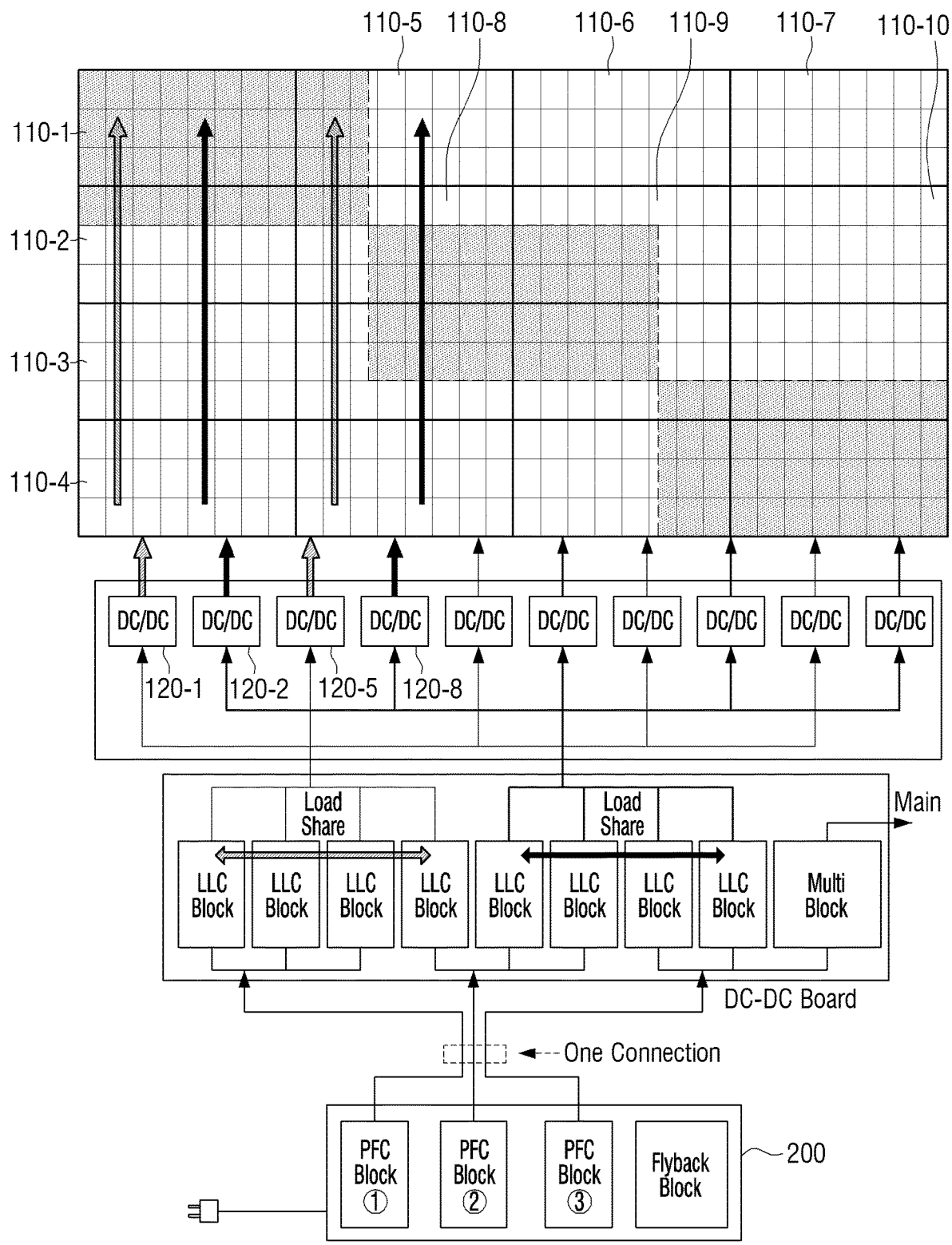
FIGS. 9A and 9B are diagrams illustrating examples of power sharing according to another embodiment.
Figure 9B:
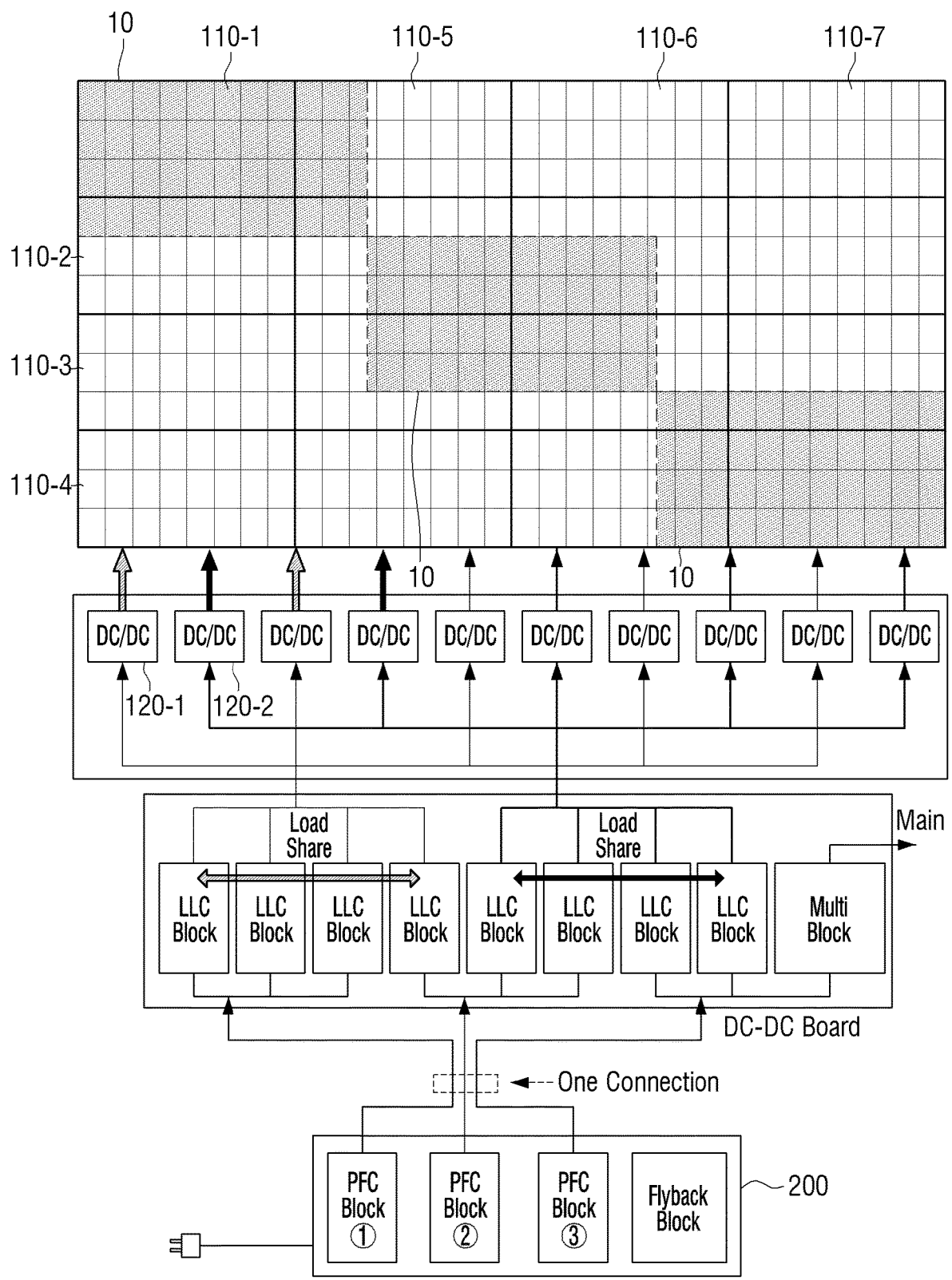

FIGS. 9A and 9B are diagrams illustrating examples of power sharing according to another embodiment.

Referring to FIG. 9A, the display apparatus 100 may receive power from the electronic apparatus 200. For example, the power line of the electronic apparatus 200 may be connected to the power socket supplying the normal power (for example, 90 to 264 V), and the electronic apparatus 200 may provide the normal power to the display apparatus 100.

The electronic apparatus 200 according to an embodiment may include the PFC circuit, or the like. The electronic apparatus 200 may rectify and smooth the normal power to output the power as AC power of a certain level, and satisfy the PF regulation on an electronic product by eliminating reactive power.

The electronic apparatus 200 may be connected to the display apparatus 100, and supply power to the display apparatus 100.

Referring to FIG. 9A, first to $n^{th}$ PFC circuits provided in the electronic apparatus 200 may supply power to a plurality of driving modules provided in the display apparatus 100, respectively. For example, the first PFC circuit provided in the electronic apparatus 200 may supply power to the first through $n^{th}$ Inductor-Inductor-Capacitor (LLC) circuits provided in the display apparatus 100, and a plurality of LLC circuits may supply power to the plurality of driving modules 120 for power sharing. Here, the LLC circuit may refer to an LLC resonant converter. However, the embodiment is not limited thereto. For example, the display apparatus 100 may provide the power supplied from the electronic apparatus 200 to the driving module via various types of converters. In addition, the converter may be a component of the display apparatus 100, but may also be a component of the electronic apparatus 200. For example, the converter may be provided in the electronic apparatus 200 and may supply power to the plurality of driving modules 120 provided in the display apparatus 100.

Each of the first, second, fifth and eighth driving modules 120-1, 120-2, 120-5 and 120-8 provided in the display apparatus 100 may provide power supplied from the first to the $N^{th}$ PFC circuit to the first, second, fifth, and eighth display modules 110-1, 110-2, 110-5, and 110-8. For example, the first driving module 110-1 may supply power to the first, second, fifth, and eighth display modules 110-1, 110-2, 110-5, and 110-8, and the second driving module 110-2 may supply power to the first, second, fifth and eighth display modules 110-1, 110-2, 110-5 and 110-8, the fifth driving module 110-5 may provide power to the first, second, fifth, and eighth display modules 110-1, 110-2, 110-5, and 110-8, and the eighth driving module 110-8 may provide power to the first, second, fifth, and eighth display modules 110-1, 110-2, 110-5, and 110-8. The first display module 110-1, the second display module 110-2, the fifth display module 110-5, and the eighth display module 110-8 may share the supply power.

Referring to FIG. 9B, a first PFC circuit provided in the electronic apparatus 200 according to an embodiment may supply power to the first to $n^{th}$ LLC circuits provided in the display apparatus 100, and a plurality of LLC circuits may supply power to the plurality of driving modules 120 for power sharing.

For example, each of the first and second driving modules 120-1 and 120-2 provided in the display apparatus 100 may supply power supplied from the first to the $n^{th}$ PFC circuit provided in the electronic device 200 to the first and second driving modules 120-1 and 120-2. The first driving module 110-1 may supply power to the first and second display modules 110-1 and 110-2 and the second driving module 110-2 may supply power to the first and second display modules 110-1 and 110-2. The first display module 110-1 and the second display module 110-2 may share the supply power.

The power sharing illustrated in FIGS. 9A and 9B are embodiment, and the display apparatus 100 may share power supplied from the electronic apparatus 200 in various formats. For example, the odd number of display modules may share supply power, and each of two or three display modules may share supply power.

Figure 10:
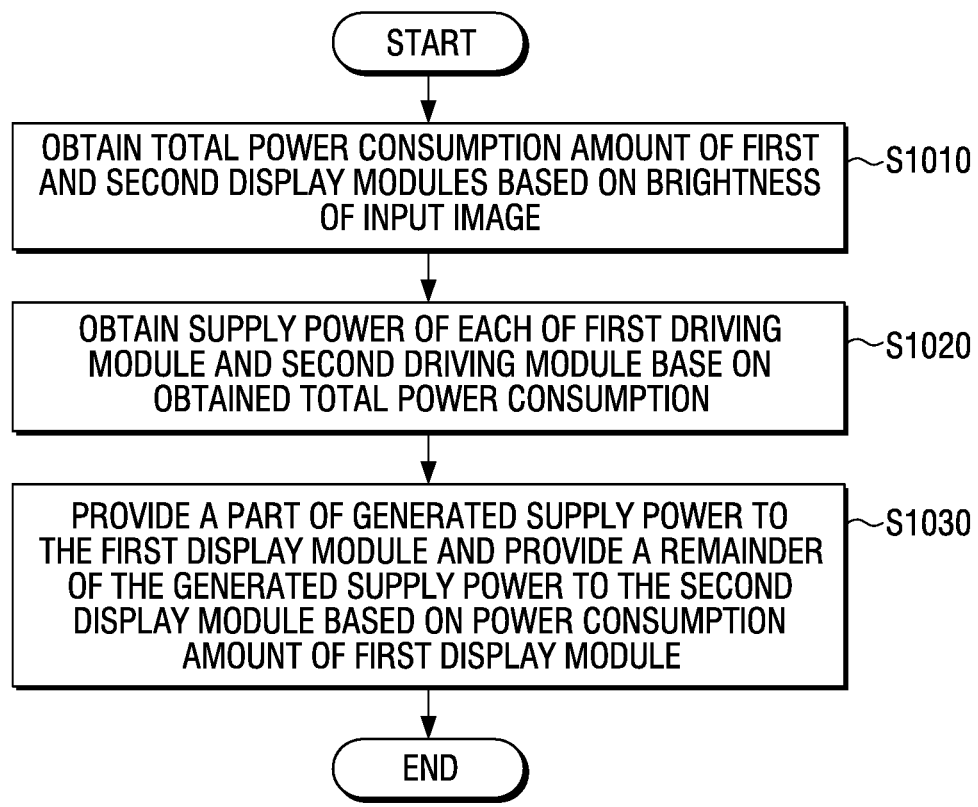
FIG. 10 is a flowchart illustrating an example method of controlling a display apparatus according to an embodiment.

FIG. 10 is a flowchart illustrating an example method of controlling a display apparatus according to an embodiment.

A method of controlling a display apparatus including the first and second display modules, the first driving module connected to the first display module and the second module connected to the second display module may obtain the total power consumption of the first and second display modules based on brightness of an input image in step S1010.

The supply power of each of the first and second driving modules is obtained based on the obtained total power consumption in step S1020.

Based on the obtained supply power, the first and second driving modules are controlled in step S1030.

Here, the step of controlling the first and second driving modules in S1030 may include the step of controlling so that a part of the supply power of the first driving module is supplied to the second display module based on the power consumption of the first display module.

In step S1010 of obtaining the total power consumption, the total power consumption may be obtained based on individual power consumption of the first and second display modules, and in step S1020 of obtaining supply power, supply power of each of the first and second driving modules may be obtained by bisecting (e.g., averaging) the total power consumption.

In addition, the step S1030 of controlling the first and second driving modules may include a step of controlling the remainder of the supply power of the first driving module to be provided to the first display module, and controlling so that a part of the supply power of the second driving module is provided to the first display module and the remainder of the supply power of the second driving module is provided to the second display module.

In step S1030 of controlling the first and second driving modules, the step of providing the remainder of the supply power of the second driving module to the second display module, based on the power consumption amount of the second display module may be included.

The display apparatus according to an embodiment may include a switch connected to each of the first and second driving modules, and the controlling method according to an embodiment may include, when an error is identified in the first driving module, controlling the first switch connected to the first driving module to block the supply power of the first driving module from being supplied to the first and second display modules.

The first display module may be driven based on the supply power provided from the second driving module.

The method according to an embodiment may include the step of displaying a UI notifying that an error occurs in the first driving module.

In addition, a part of the supply power of the second driving module provided to the first display module may correspond to half of the power consumption of the first display module, and the remainder of the supply power of the first driving module provided to the first display module may correspond to half of the power consumption amount of the first display module, a part of the supply power of the first driving module provided to the second display module may correspond to half of the power consumption amount of the second display module, and the remainder of the supply power of the second driving module provided to the second display module may correspond to half of the power consumption amount of the second display module.

Here, the second display module may be a module which is spaced apart from the first display module by the predetermined number of display modules, and the first driving module may be connected to the second driving module.

The display apparatus according to an embodiment may include a plurality of display modules arranged in a format of N*M, and the second display module may be spaced apart from the first display module by M/2 number of display modules in the horizontal direction, or may be a module that is spaced apart by N/2 number of display modules in the vertical direction from the first display module.

In step S1020 of obtaining supply power of each of the first and second driving modules may include, when an image having a brightness value greater than or equal to a predetermined size from the first and second display modules, obtaining supply power of the first and second driving modules.

Here, each of the first and display modules may be implemented as an LED module including at least one LED element or an LED cabinet in which a plurality of LED modules is connected.

The various embodiments described above may be embodied in a non-transitory computer-readable recording medium which may be read by a computer or a similar device using software, hardware or combination thereof. In some cases, the embodiments described herein may be implemented by the processor itself. According to a software implementation, embodiments such as the procedures and functions described herein may be implemented in separate software modules. Each of the software modules may perform one or more of the functions and operations described herein.

Computer instructions for performing a processing operation according to the above-described various embodiments may be stored in a non-transitory computer-readable medium. The computer instructions stored in the non-transitory computer-readable medium may allow a specific device to perform the processing operation according to the above-described embodiments when the computer instructions are executed through a processor.

The non-transitory computer-recordable medium is an apparatus-readable medium configured to semi-permanently store data. For example, the non-transitory apparatus-readable medium may be a compact disc (CD), a digital versatile disc (DVD), a hard disc, a Blu-ray disc, a universal serial bus (USB), a memory card, a read only memory (ROM), and the like.

The present teaching can be readily applied to other types of apparatuses. Also, the description of embodiments is intended to be illustrative, and not to limit the scope of the claims, and many alternatives, modifications, and variations will be apparent to those skilled in the art. While one or more embodiments have been described with reference to the figures, it will be understood by those of ordinary skill in the art that various changes in form and details may be made therein without departing from the spirit and scope as defined, for example, by the following claims and their equivalents.

What is claimed is:

1. A display apparatus comprising:
a display including a first display module and a second display module;
a first driving module comprising driving circuitry connected to the first display module;
a second driving module comprising driving circuitry connected to the second display module; and
a processor configured to:
obtain total power consumption of the first display module and second display module based on a brightness of an input image,
obtain supply power of each of the first driving module and second driving module based on the obtained total power consumption,
control the first driving module and the second driving module based on the obtained supply power,
control the display apparatus so that a part of supply power of the first driving module is provided to the second display module based on power consumption of the first display module;
control the display apparatus so that a remainder of the supply power of the first driving module is provided to the first display module, and
control the display apparatus so that a part of the supply power of the second driving module is provided to the first display module and a remainder is provided to the second display module based on power consumption of the second display module.

2. The display apparatus of claim 1, wherein the processor is configured to:
obtain the total power consumption based on individual power consumption of the first display module and the second display module, and
obtain the supply power of each of the first driving module and second driving module by bisecting the total power consumption.

3. The display apparatus of claim 1, comprising:
a switch connected to each of the first driving module and the second driving module,
wherein the processor is configured to block supply power of the first driving module to be supplied to the first display module and the second display module by controlling a first switch connected to the first driving module based on an error being identified in the first driving module,
wherein the first display module is configured to be driven based on the supply power supplied from the second driving module.

4. The display apparatus of claim 3, wherein the processor is configured to control the display to display a user interface (UI) notifying that an error occurs in the first driving module.

5. The display apparatus of claim 1, wherein:
a part of supply power of the second driving module supplied to the first display module corresponds to half of power consumption of the first display module,
a remainder of supply power of the first driving module supplied to the first display module corresponds to half of power consumption of the first display module,
a part of supply power of the first driving module supplied to the second display module corresponds to half of power consumption of the second display module, and
a remainder of supply power of the second driving module supplied to the second display module corresponds to half of power consumption of the second display module.

6. The display apparatus of claim 1, wherein the second display module is a module spaced apart from the first display module by a predetermined number of display modules, and
wherein the first driving module is connected to the second driving module.

7. The display apparatus of claim 1, wherein the display comprises a plurality of display modules including the first display module and the second display module, the plurality of display modules disposed in a format of N*M, and
wherein the second display module is spaced apart from the first display module by M/2 number of display modules in a horizontal direction, or
wherein the second display module is spaced apart from the first display module by N/2 number of display modules in a vertical direction.

8. The display apparatus of claim 1, wherein the processor is configured to:
obtain the supply power of each of the first driving module and the second driving module based on the input image having a brightness value greater than or equal to a predetermined size being output from at least one of the first display module and the second display module, and control the first driving module and the second driving module on the obtained supply power.

9. The display apparatus of claim 1, wherein each of the first display module and the second display module comprises a light emitting diode (LED) module including at least one LED element or an LED cabinet in which a plurality of LED modules are connected.

10. A method of controlling a display apparatus including a first display module, a second display module, a first driving module connected to the first display module, and a second driving module connected to the second display module, the method comprising:
- obtaining total power consumption of the first display module and second display module based on brightness of an input image;
- obtaining supply power of each of the first driving module and second driving module based on the obtained total power consumption; and
- controlling the first driving module and the second driving module based on the obtained supply power,
- wherein the controlling the first driving module and the second driving module comprises controlling the display apparatus so that a part of supply power of the first driving module is supplied to the second display module based on power consumption of the first display module,
- wherein the controlling the first driving module and the second driving module comprises:
  - controlling so that a remainder of the supply power of the first driving module is supplied to the first display module; and
  - controlling so that a part of the supply power of the second driving module is supplied to the first display module and a remainder is supplied to the second display module based on power consumption of the second display module.

11. The method of claim 10, wherein the obtaining the total power consumption comprises obtaining the total power consumption based on individual power consumption of the first display module and the second display module, and
- wherein the obtaining the supply power comprises obtaining the supply power of each of the first driving module and second driving module by bisecting the total power consumption.

12. The method of claim 10, wherein the display apparatus comprises a switch connected to each of the first driving module and the second driving module,
- wherein the method further comprises blocking supply power of the first driving module to be supplied to the first display module and the second display module by controlling a first switch connected to the first driving module based on an error being identified in the first driving module, and
- wherein the first display module is configured to be driven based on the supply power supplied from the second driving module.

13. The method of claim 12, comprising:
- displaying a user interface (UI) notifying that an error occurs in the first driving module.

14. The method of claim 10, wherein:
- a part of supply power of the second driving module supplied to the first display module corresponds to half of power consumption of the first display module,
- a remainder of supply power of the first driving module supplied to the first display corresponds to half of power consumption of the first display module,
- a part of supply power of the first driving module supplied to the second display module corresponds to half of power consumption of the second display module, and
- a remainder of supply power of the second driving module supplied to the second display module corresponds to half of power consumption of the second display module.

15. The method of claim 10, wherein the second display module is a module spaced apart from the first display module by a predetermined number of display modules, and
- wherein the first driving module is connected to the second driving module.

16. The method of claim 10, wherein the display apparatus comprises a plurality of display modules including the first display module and the second display module, the plurality of display modules disposed in a format of N*M, and
- wherein the second display module is spaced apart from the first display module by M/2 number of display modules in a horizontal direction, or
- wherein the second display module is spaced apart from the first display module by N/2 number of display modules in a vertical direction.

17. The method of claim 10, wherein the obtaining supply power of each of the first driving module and the second driving module comprises obtain the supply power of each of the first driving module and the second driving module based on the input image having a brightness value greater than or equal to a predetermined size being output from at least one of the first display module and the second display module.

18. The method of claim 10, wherein each of the first display module and the second display module comprises a light emitting diode (LED) module including at least one LED element or an LED cabinet in which a plurality of LED modules is connected.

* * * * *